United States Patent [19]

Sawada et al.

[11] Patent Number: 4,628,451
[45] Date of Patent: Dec. 9, 1986

[54] DATA PROCESSING APPARATUS FOR VIRTUAL MEMORY SYSTEM

[75] Inventors: Hideo Sawada; Kiyoshi Yata, both of Hadano, Japan

[73] Assignee: Hitachi, Ltd., Tokyo, Japan

[21] Appl. No.: 462,120

[22] Filed: Jan. 28, 1983

[30] Foreign Application Priority Data

Feb. 12, 1982 [JP] Japan ................... 57-20721

[51] Int. Cl.⁴ .............................. G06F 9/34
[52] U.S. Cl. .................................. 364/200
[58] Field of Search ... 364/200 MS File, 364 900 MS File

[56] References Cited

U.S. PATENT DOCUMENTS

| | | | |
|---|---|---|---|
| 4,145,738 | 3/1979 | Inoue et al. | 364/200 |
| 4,170,039 | 10/1979 | Beacom et al. | 364/200 |
| 4,218,743 | 8/1980 | Hoffman et al. | 364/200 |
| 4,356,549 | 10/1982 | Chueh | 364/200 |
| 4,373,179 | 2/1983 | Katsumata | 364/200 |
| 4,466,056 | 8/1984 | Tamahashi | 364/200 |

Primary Examiner—Thomas M. Heckler
Attorney, Agent, or Firm—Antonelli, Terry & Wands

[57] ABSTRACT

A data processing apparatus for a virtual memory system including a logical address register, a real address register, a paged address translation table and an address translation buffer in which a map of a fraction of the paged address translation table is stored columnwise. Upon checking address translatability of a logical address into a real address, a bit of a translation control word contained in the column of the address translation buffer relevant to that logical address indicates whether or not a succeeding logical address is susceptible to the address translation. Necessity to pretest the address translatability of every logical address is obviated. System overhead is considerably reduced.

10 Claims, 5 Drawing Figures

FIG.5

| No. | OPERANDS | LENGTH BITS l₀ l₁ l₂ l₃ | PAGE DISPLACEMENT 13 14 15 16 17 18 19 20 21 22 23 | ADDEND |
|---|---|---|---|---|
| 1 | H W | — | 1 1 1 1 1 1 1 1 1 1 x | + 1 |
| 2 | F W | — | 1 1 1 1 1 1 1 1 1 x x | + 3 |
| 3 | D W | — | 1 1 1 1 1 1 1 1 x x x | + 7 |
| 4 | S S | 0 0 0 0 | 1 1 1 1 1 1 1 x x x x | + 15 |
| 5 | 〃 | 0 0 0 1 | 1 1 1 1 1 1 x x x x x | + 31 |
| 6 | 〃 | 0 0 1 X | 1 1 1 1 1 x x x x x x | + 63 |
| 7 | 〃 | 0 1 X X | 1 1 1 1 x x x x x x x | + 127 |
| 8 | 〃 | 1 X X X | 1 1 1 x x x x x x x x | + 255 |

DATA PROCESSING APPARATUS FOR VIRTUAL MEMORY SYSTEM

BACKGROUND OF THE INVENTION

The present invention relates to a data processing apparatus for a virtual memory system which is capable of examining at a high speed whether the addresses of operands of instructions to be executed are susceptible to address translation.

In a computer system in which a virtual memory system is employed, data stored in a main memory device of the computer system is designated by logical addresses which are provided separately from the addresses (real addresses) which serve to indicate physical locations of the data. In this connection, the correspondences between the logical addresses and the real addresses are determined with the aid of an address translation table stored in the main memory. The address translation table in turn is supervised by an operating system.

When a given instruction is to be executed in the computer system outlined above, it is examined prior to the execution of the instruction to determine whether or not the logical address of the given instruction or relevant operand is susceptible of address translation, i.e., whether the logical address in concern is validly resident in the address translation table, whereby the instruction is allowed to be executed when the result of the examination has proven affirmative. This check or examination is referred to as a pretest.

Referring to FIG. 1 which shows in a functional block diagram a typical address translation scheme, reference numeral 1 denotes a logical address register in which a logical address is loaded, numeral 2 denotes a real address register in which a real address resulting from the address translation is loaded, numeral 3 denotes an address translation table stored in a main memory device, and reference numeral 4 denotes an address translation buffer or TLB in which a portion or fragment of the address translation table is copied. As is known, the address translation is usually carried out on the basis of a space paged as a unit size, which space is commonly referred to as a page. Upon address translation, the significant or upper-order bits representing the page address of the logical address register 1 are translated to the page address of the real address register 2 through the address translation buffer 4 directly or with the aid of the address translation table 3, if demanded. On the other hand, the lower-order bits or less significant bits indicating the page displacement of the logical address register 1 are directly used as the page displacement of the real address register 2. The main memory device is accessed with the aid of the address loaded in the real address register 2.

The pretest memtioned hereinbefore is effected in the address translation scheme such as illustrated in FIG. 1.

Now, assuming that operands of variable length are stored in a main memory device and that an instruction is issued for processing operands each having the maximum length which does not exceed the size of a single page, a procedure for executing the pretest of these operands will be elucidated below by referring to FIG. 2.

In FIG. 2, there is illustrated the paged state in which a first operand and a second operand are stored in the main memory device. As can be seen from the figure, the first operand labelled "1 op" is stored extending consecutively from page 1 to next page 2, while the second operand labelled "2 op" is stored over page 3 and page 4 in continuity. The consecutive storage or entry of an operand over two adjacent pages in this manner is referred to as the inter-page consecution of an operand. In this illustrated case, a check of the first operand "1 op" must be made for the two pages 1 and 2, while the check of the second operand "2 op" has to be made over the two pages 3 and 4. Accordingly, the pretest as to whether the address translation is possible (i.e. address translatability) or not must be carried out as many as four times.

SUMMARY OF THE INVENTION

An object of the present invention is to reduce the time required for the pretest by decreasing the number of times required for checking the address translatability during the pretest.

In view of the above object, it is taught by the present invention that a bit is allotted for each of the entries in the address translation table for indicating that one or both of the preceding and succeeding logical page addresses are susceptible to address translation.

BRIEF DESCRIPTION OF THE DRAWINGS

Objects, features and advantages of the present invention will be made apparent from description of the preferred embodiments of the invention. The description make reference to the accompanying drawings, in which:

FIG. 5 is a view for illustrating conditions for detecting inter-page consecution of operands.

DESCRIPTION OF THE PREFERRED EMBODIMENT

Figure 1:
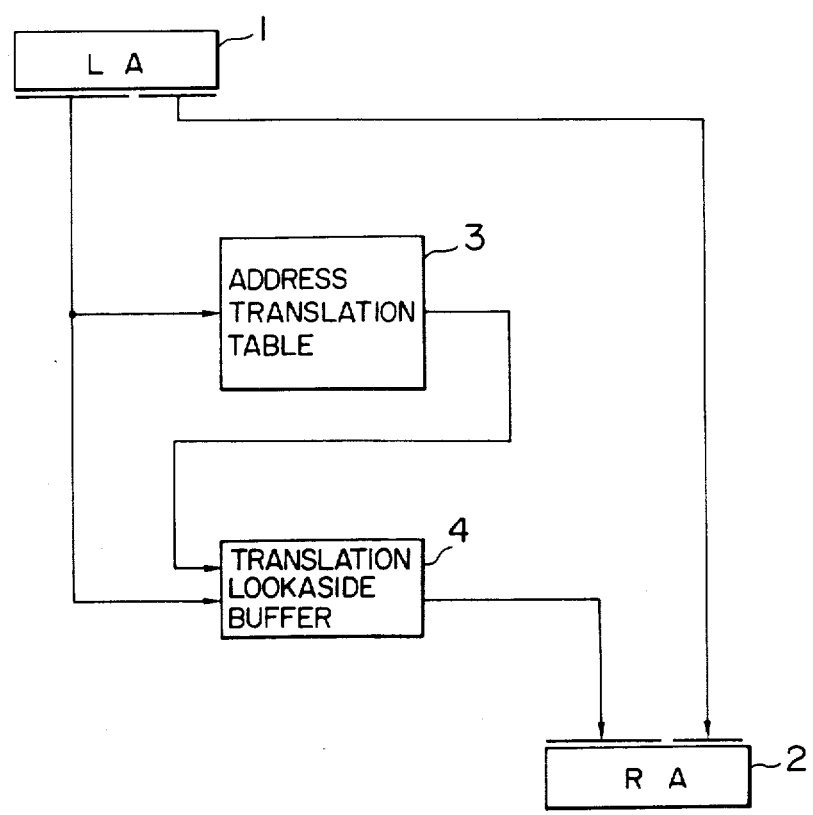
FIG. 1 is a functional block diagram illustrating an address translation scheme.
Figure 2:
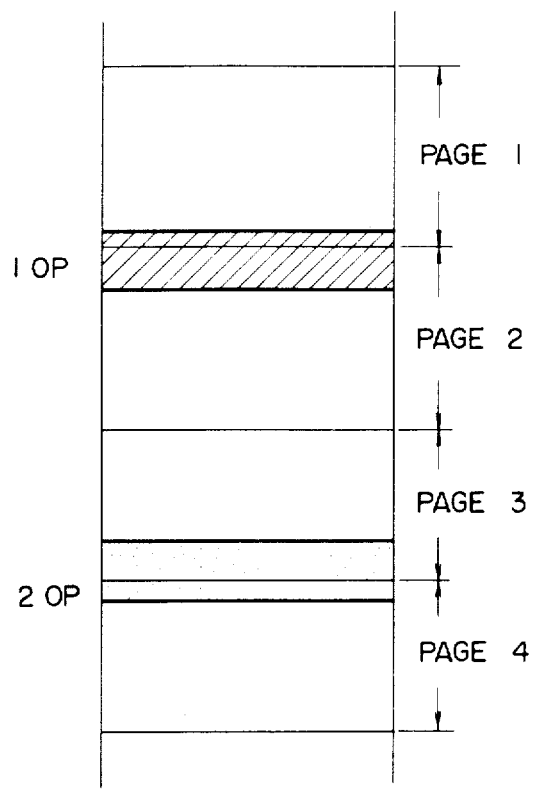
FIG. 2 is a view illustrating paged locations of operands in a main memory.
Figure 3:
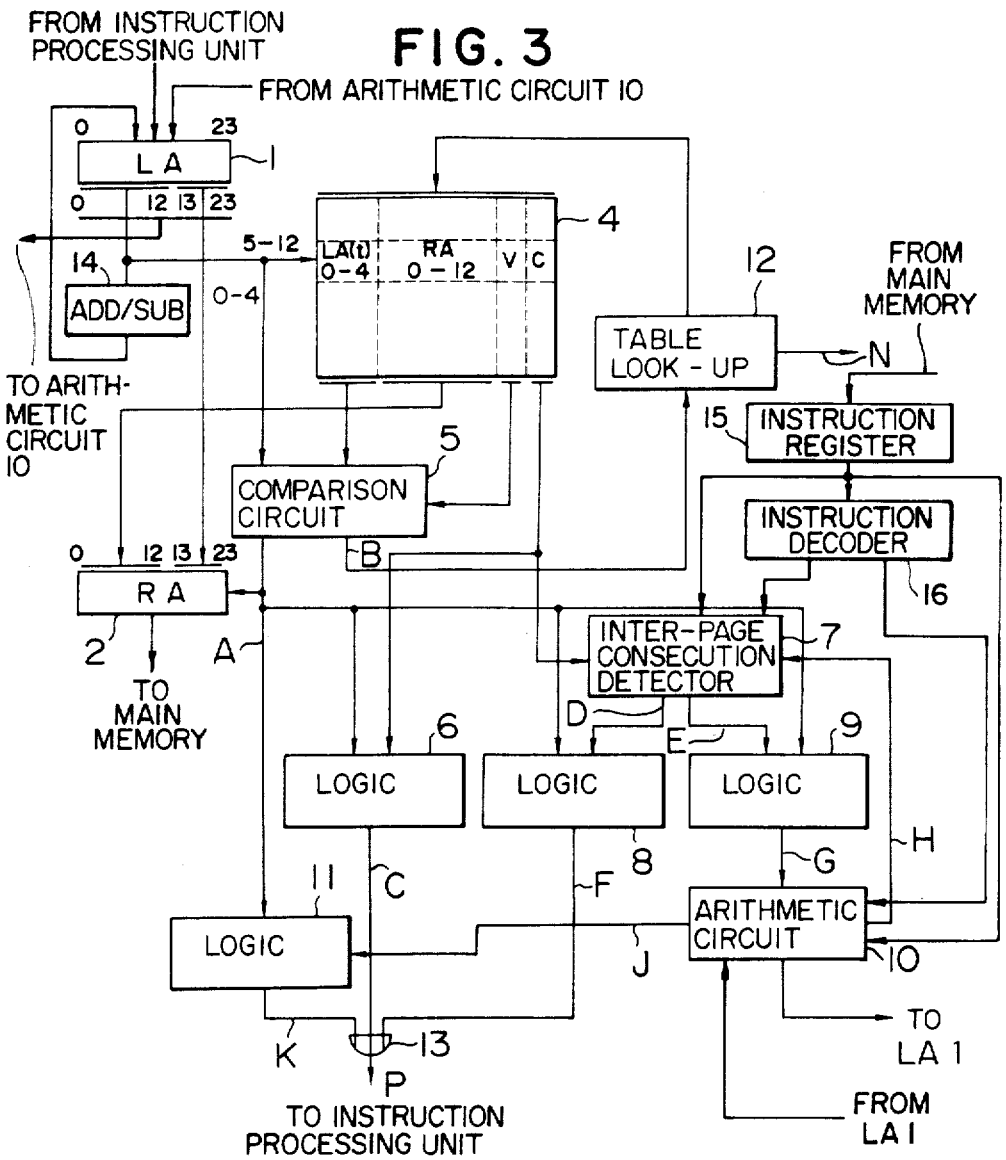
FIG. 3 is a block diagram showing an address translation scheme according to an embodiment of the present invention.
Figure 4:
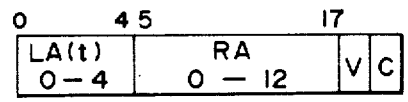
FIG. 4 is a view for illustrating contents of a given column of an address translation buffer used in the system shown in FIG. 3.

FIG. 3 shows in a block diagram an address translation mechanism or scheme according to an embodiment of the invention. In this figure, there is illustrated an arrangement for executing a process in which a logical address of the logical address register 1 is translated into a real address through the address translation buffer 4 with the aid of the address translation table, if demanded, the real address resulting from the translation being loaded into the real address register 2. The address translation buffer 4 includes 256 rows one for each page. As shown in FIG. 4, a word which occupies each of the rows is composed of the more significant bits LA(t) 0 to LA(t) 4 representative of the upper bits of the page address of a logical address, corresponding real address bits RA 0 to RA 12, a chain bit C and a validity bit V, and thus includes 20 bits in total. Among these bits, the chain bit C is the control bit newly and additionally included according to the teaching of the invention. This chain bit C serves to indicate whether or not the logical address of the page immediately succeeding to the one which that bit C belongs is susceptible to address translation, i.e., whether an entry for that page is present in the buffer 4. More specifically when the bit C is logic "1", it is indicated that the logical address of the succeeding page is susceptible to address translation, while the bit C of logic "0" indicates that the logical address of the succeeding page is incapable of undergoing address translation. When there is no page data relating to the address to be translated in the address translation buffer 4, new page data which is obtained from the address translation table 3 in the main memory device is placed in a predetermined row of the address translation buffer 4 by means of the table look-up mechanism 12.

Whenever new data is placed in the address translation buffer 4, it is checked to see whether or not the page succeeding the logical address of that data is resident in the translation buffer 4. If the page in concern is present, the bit C is set to "1", while it is set to "0" if that page is not present. Usually, the order in which the rows of the translation buffer 4 are arrayed corresponds to the order of the page addresses of the logical addresses. Accordingly, the check as to the presence of the succeeding page as mentioned above may be realized by checking the corresponding succeeding row in the buffer 4.

Upon entry of new data in a given one of the rows of the address translation buffer 4, the chain bit C residing at the row preceding to that given one holds the preceding state. Accordingly, in case the preceding row holds the page which precedes the logical address of the new data to be set, the relevant C bit of the preceding row is set to "1". On the other hand, when the preceding row holds another page, the C bit thereof is set to "0". The above-mentioned reference operation of the preceding or succeeding row is effected by replacing the row address value of the newly added data held in the address register LA1 with a unit incremented or decremented value by means of an adder/substractor 14.

In the address translating operation of the mechanism illustrated in FIG. 3, one of the 256 rows of the address translation buffer 4 is at first selected to be read out in response to the fifth to twelfth bits among the more significant bits 0 to 12 of the page address of the logical address. When the validity or V bit outputted from the address translation buffer 4 is logic "1", the comparison circuit 5 is enabled and the more significant bits 0 to 4 of the logical address supplied from the logical address register 1 are compared by a comparison circuit 5 with the bits 0 to 4 (the more significant bits of the logical address) supplied from the address translation buffer 4. When coincidence is found, a signal A is produced from the output of the comparison circuit 5, whereupon the bits 5 to 17 (real address bits 0 to 12) outputted from the address translation buffer 4 are set at the bits 0 to 12 of the read address register 2, while the less significant bits 13 to 23 of the logical address register 1 are set at the 13th to 23rd bit positions of the real address register 2.

Now, the pretest is carried out with the address translation scheme shown in FIG. 3. In this connection, it is assumed that each operand involved in the pretest has the maximum length which does not exceed the size of one page.

When a logical address indicating the leading section of an operand is placed in the logical address register 1, the content of the corresponding row of the address translation buffer 4 is read out in a manner similar to the aforementioned address translation. When a page on which the leading address of the operand is entered is either absent in the address translation buffer 4 or found not to be valid, the comparison circuit 5 then produces a signal B as the output signal. When this signal B is produced, the desired page is searched in the address translation table 3 stored in the main memory with the aid of a table look-up mechanism 12 and placed in the address translation buffer 4, which again undergoes the readout operation described above. Unless the desired item or page is found, the table look-up mechanism 12 produces a signal N. Provided that both the page on which the leading address of the operand is entered and the succeeding page are resident in the address translation buffer 4 and that they are both valid, the comparison circuit 5 produces the signal A with the chain bit C of logic "1" being outputted from the address translation buffer 4. At the same time, a signal C is produced by a logic circuit 6.

Reference numeral 7 denotes an inter-page consecution detecting circuit for determining if an operand extends consecutively over the two adjacent pages when the chain bit C from the address translation buffer 4 is logic "0". This circuit 7 is connected to an instruction register 15 and an instruction decoder 16 for decoding the instruction read out of the main memory device so as to determine the inter-page consecution of an operand in dependence on the types of instructions, the length of the operands and the page displacement of the operand to thereby produce a signal E in case the inter-page consecution of an operand is found, while producing a signal D in the absence of the inter-page consecution.

Provided that the page in which the leading address of an operand is entered is validly present in the address translation buffer 4, that the chain bit C from the address translation buffer 4 is logic "0" and that the operand does not extend to the succeeding page (i.e., in the case of the absence of the inter-page consecution), the comparison circuit 5 produces the signal A while the inter-page consecution detecting circuit 7 produces the signal D. At that time, a logic circuit 8 outputs a signal F.

On the other hand, provided that the page in which the leading address of the operand is entered is validly present in the address translation buffer 4, that the chain bit C from the address translation buffer 4 is logic "0" and that the operand extends to the succeeding page in continuity (i.e., in the case of the presence of the inter-page consecution), the comparison circuit 5 produces the signal A while the inter-page consecution detecting circuit 7 produces the signal E. At that time, a logic circuit 9 outputs a signal G. When the signal G is thus produced, the last address of the operand (which appears on the next page) is arithmetically determined by an arithmetic circuit 10 and loaded in the logical address register 1. The last address of an operand can be obtained by adding the operand length which is determined by the type of an instruction held in the instruction register 15 to the top address of the operand. As described later, the operand length becomes the value shown in ADDEND of FIG. 5, for example, for instructions involving fixed length operands identified by Nos. 1–3, and on the other hand for instructions involving variable length operands, the operand length is determined in accordance with the value shown in the length bit field $l_0$–$l_7$ of the instruction. After the arithmetic determination, the processing operation described above is repeated for this last address except that the operation of the inter-page consecution detecting circuit 7 is inhibited by a signal H produced by the arithmetic circuit 10 and that operation of a logic circuit 11 is validated by a signal J produced by the arithmetic circuit 10. The logic circuit 11 produces a signal K when the signal A is produced by the comparison circuit 5 in the processing operation for the last address.

The signals C, F and K are ORed to a signal P through an OR gate 13, which signal P indicates that the operand is susceptible to address translation. On the other hand, the signal N mentioned hereinbefore represents that the address translation of the operand is not possible.

As will be appreciated from the foregoing, the check or test as to the address translatability of the last address of the operand is rendered unnecessary when the signals C and F are produced. Accordingly, the number of times the address translatability is checked is correspondingly decreased. Further, the operation for calculating the last address is rendered unnecessary.

Next, the principle of the inter-page consecution detecting operation of the circuit 7 will be elucidated below by referring to FIG. 5.

As types of instructions, there may be mentioned eight types of instructions which include three types of instructions for dealing with operands each of a fixed length, that is, instructions for dealing with a half word operand (HW), instructions for dealing with a full word (FW) operand and instructions for dealing with a double-word operand (DW) and additionally five types df instructions (SS) for dealing with operands of variable length, as is illustrated in FIG. 5. It should be noted that some bits unimportant for the inter-page consecution detection are omitted in FIG. 5. Namely, only a part of the operand length field $l_0-l_7$ contained in the instructions are illustrated in the column of "LENGTH DISPLACEMENT" only a part of the displacement field bits 0-23 contained in the instruction for the address designation of the first and second operands are illustrated.

The first mentioned half-word (HW) operand identified with No. 1 in FIG. 5 is limited in the length to 2 bytes. Accordingly, when the 13th to 22nd bits among the less significant 13th to 23rd bits (page displacement) of the leading logical address bits 0 to 23 are all logic "1's" with the last or least significant bit x is logic "0", the last logical address corresponds to the value resulting from the addition of 1(one), i.e., all of the 13th to 23rd bits take logical values "1", indicating the absence of the inter-page consecution of the last address. However, when the least significant bit x is logic "1", the last logical address corresponds to the value resulting from the addition of 1(one), i.e., all the 13th to 23rd bits take the logical values "0's", whereby a carry is produced at the 13th bit position, indicating continuation or consecution of the last logical address to the succeeding page, that is, the presence of the interpage consecution of the last address.

The second mentioned (No. 2) full word operand (FW) is of 4 bytes in length. Accordingly, when 13th to 21st bits of the leading logical address are logic "1's" with the 22nd and 23rd bits represented by xx being logic "0's", no inter-page consecution is present even after the addition of 3. However, when xx="01", "10" or "11", the addition of 3 results in the inter-page consecution of the last address. Same applies to the third mentioned double word operand (DW). When the last three bits are all logic "0's", no inter-page consecution of the last address will occur. However, when at least any one of the last three bits is logic "1", the inter-page consecution of the last address is present.

In the case of the operand of the instructions (SS: Storage to Storage) for dealing with the operand of variable length, a check is made on a length section $l_0$ to $l_7$ of the instruction designating the operand length with $l_0$ to $l_3$ being used to the effect of simplification. It is to be noted that "(operand length)-1" is set at the length section $l_0$ to $l_7$ so as to be able to designate the operand of the length in the range from 1 to 256 bytes. In the case of the variable length operand identified by No. 4 in the table shown in FIG. 5, the length of the operand may vary in the range from 1 to 16 bytes. The condition for the presence of the inter-page consecution may be checked on the basis of the result of the addition of 15 to the current address on the assumption that the operand length is 16 bytes. If no carry is produced even by the addition of 15, the inter-page consecution does not occur in the current operand. More specifically, the length bits $l_0$ to $l_3$ are all "0's". When the 13th to 19th bits of the page displacement of the leading logic address are all "1's" with the remaining 20th to 23rd bits "xxxx" being "0000", the inter-page consecution is not present. However, when at least any one of the 20th to 23rd bits is logic "1", the inter-page consecution is present. In the case of the variable length operand identified with No. 5, the length of the operand may vary in the range from 17 bytes to 32 bytes. The inter-page consecution may be checked on the basis of the result of addition of 31 to the leading address on the assumption that the operand is 32 bytes long. If no carry is produced even by the addition of 31, the inter-page consecution does not occur in the current operand. In this case, since the operand length bits $l_0$ to $l_7$ may vary from "00010000" to "00011111", the length bits $l_0$ to $l_3$ are "0001".

The conditions for the inter-page consecution can be checked for the variable length operands Nos. 6, 7 and 8 in a quite similar manner.

In the case of the embodiment described above, it is assumed that the chain bit C indicates whether or not the page succeeding the one to which the bit C belongs is susceptible to address translation. However, an arrangement also may be made such that the chain bit C indicates whether the preceding page is susceptible to the address translation or whether both the preceding and the succeeding page are susceptible to the address translation. In this way, the teaching of the present invention can also be effectively applied to the operands of instructions which are to be processed in the sequence reverse to the order of the addresses.

Further, it has been described that the chain bit C is placed in the address translation buffer 4. However, it is possible to attach this chain bit C to each of the entries of the address translation table 3 stored in the main memory device, while a copy or map of the chain bit C of the address translation table is placed in the address translation buffer 4. Further, the chain bit C may indicate whether or not both of the preceding and the succeeding pages are susceptible to the address translation. Alternatively, two chain bits may be employed, one for indicating whether the succeeding page is susceptible to the address translation while the other indicates the address translatability of the preceding page.

In the embodiment described above, the chain bit C of the N-th column of the address translation buffer 4 is set only when the N-th and (N+1)-th columns hold the n-th and (n+1)-th pages, respectively. However, in case where the n-th and (n+1)-th pages are validly resident in the address translation table 3, the chain bit C of the N-th column of the buffer 4 can be set even when the (N+1)-th column does not hold the (n+1)-th page. Then, the probability of the chain bit C being "1" is considerably increased in the address translation buffer 4, whereby system overhead is further reduced.

What is claimed is:

1. A data processing apparatus for a virtual memory system comprising:
   a first register for holding a logical address;
   a main memory including a plurality of addressable memory blocks for storing instructions and for storing multi-byte operands which are designated by a logical address of a top byte of the multi-byte operand in said instructions;
   instruction means for holding and decoding an instruction to be executed and for supplying a logical address from said instruction to said first register;
   table means for effecting address translation of said logical address to a real address for accessing said main memory, including a plurality of entries, each entry having a logical block address, a real block address corresponding to said logical block address and an indication bit indicative of whether an entry of a memory block logically adjacent to the memory block designated by the logical block address in the entry is present in said table means;
   means connected to said first register and said table means for reading out an entry from said table means on the basis of the content of said first register;
   a second register connected to said first register and said table means for holding a real address for the access of said main memory, said real address being composed of a part of the logical address received from said first register and the real block address in a read out entry from said table means;
   means connected to said reading out means for generating a signal indicative of the fact that all bytes of a multi-byte operand designated by an instruction read out from said main memory and held by said instruction means are address-translatable by said table means at the time the address of the top byte of the operand is placed in said first register to read out an entry from said table means, when said indication bit in the read out entry indicates the presence of an entry of the next-adjacent memory block in said table means; and
   address generating means connected to said reading out means and said instruction means for generating and providing to said first register the byte address of the last byte of said multi-byte operand determined in accordance with said instruction held by said instruction means, when said indication bit in the read out entry indicates the absence of an entry of the adjacent memory block in said table means.

2. A data processing apparatus according to claim 1, wherein said indication bit in each entry indicates the presence or absence of an entry of a memory block logically succeeding the memory block corresponding to said each entry.

3. A data processing apparatus according to claim 2, wherein said table means is located in said main memory.

4. A data processing apparatus according to claim 2, wherein said table means is located in a buffer memory.

5. A data processing apparatus according to claim 1, wherein said indication bit in each entry indicates the presence or absence of entries of memory blocks logically both preceding and succeeding the memory block corresponding to said each entry.

6. A data processing apparatus according to claim 1, wherein said table means is located in said main memory.

7. A data processing apparatus according to claim 1, wherein said table means is located in a buffer memory.

8. A data processing apparatus according to claim 1, wherein said address generating means includes consecution detecting means for checking whether an operand extends consecutively over two logical memory blocks and for generating a signal indicative of the fact that all bytes of the operand are address-translatable without carrying out said address generation for the byte address of the last byte of the operand, when the result of checking shows that said operand is within a single memory block.

9. A data processing apparatus for a virtual memory system wherein a logical address is translated, by utilizing an address translation table, into a real address to be used for access of a main memory comprised of a plurality of memory pages for storing instructions and for storing multi-byte operands which are designated by a logical address of a top byte of the multi-byte operand in said instructions, comprising:
   store means for storing the address translation table, said store means including indication bits, each corresponding to a respective memory page designated by a logical address and indicative of whether another memory page which is located adjacent to the memory page in logical memory space is already in an address-translatable condition by the fact that said address translation table includes an entry relating to said another memory page;
   means responsive to receipt of a logical address for reading out said indication bit from said store means simultaneously with the reading out of a real address on the basis of said received logical address;
   decision means connected to said reading out means for checking the logical state of an indication bit read out by said reading out means at the time the logical address of an operand designated in an instruction read out from said main memory is address-translated, so as to generate a signal indicative of the fact that the operand is address-translatable when the indication bit shows that the adjacent memory page has an entry in said address translation table; and
   means connected to said reading out means for calculating the address of the last byte of the operand when said indication bit indicates that said adjacent memory page has no entry in said address translation table so that an entry for the operand may be stored in said address translation table on the basis of said calculated address.

10. A data processing apparatus according to claim 9, wherein said means for calculating the last address includes means for checking whether an operand extends consecutively over two memory pages, so as to output a signal indicative of the fact that the operand is address-translatable without calculating the address of the last byte of the operand when said checking means determines that the operand is within a single memory page.

* * * * *